United States Patent
Avinash

(10) Patent No.: US 7,835,562 B2
(45) Date of Patent: Nov. 16, 2010

(54) METHODS AND APPARATUS FOR NOISE REDUCTION FILTERING OF IMAGES

(75) Inventor: Gopal B. Avinash, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 1292 days.

(21) Appl. No.: 10/897,764

(22) Filed: Jul. 23, 2004

(65) Prior Publication Data

US 2006/0018526 A1    Jan. 26, 2006

(51) Int. Cl.
     *G06K 9/00*     (2006.01)
(52) U.S. Cl. ........................... 382/132; 382/260
(58) Field of Classification Search .............. 382/131, 382/132, 260
See application file for complete search history.

(56) References Cited

U.S. PATENT DOCUMENTS

| | | | |
|---|---|---|---|
| 6,173,083 B1 | 1/2001 | Avinash | |
| 6,208,763 B1 | 3/2001 | Avinash | |
| 6,556,720 B1 | 4/2003 | Avinash | |
| 6,580,779 B2 | 6/2003 | Avinash et al. | |
| 6,592,523 B2 | 7/2003 | Avinash et al. | |
| 6,614,874 B2 | 9/2003 | Avinash | |
| 6,661,873 B2 | 12/2003 | Jabri et al. | |
| 6,701,025 B1 | 3/2004 | Avinash | |
| 6,757,442 B1 | 6/2004 | Avinash | |
| 2003/0081820 A1* | 5/2003 | Avinash | 382/131 |
| 2003/0095630 A1* | 5/2003 | Avinash et al. | 378/98.9 |
| 2003/0095714 A1 | 5/2003 | Avinash | |
| 2003/0095715 A1* | 5/2003 | Avinash | 382/260 |
| 2003/0097069 A1* | 5/2003 | Avinash et al. | 600/447 |
| 2003/0099405 A1 | 5/2003 | Avinash et al. | |
| 2003/0128892 A1 | 7/2003 | Avinash | |
| 2003/0152258 A1 | 8/2003 | Jabri et al. | |
| 2003/0169848 A1 | 9/2003 | Jabri et al. | |
| 2003/0215119 A1 | 11/2003 | Uppaluri et al. | |
| 2003/0215120 A1 | 11/2003 | Uppaluri et al. | |
| 2004/0008901 A1 | 1/2004 | Avinash | |
| 2004/0081280 A1 | 4/2004 | Avinash | |
| 2004/0101104 A1 | 5/2004 | Avinash et al. | |

\* cited by examiner

*Primary Examiner*—Vu Le
*Assistant Examiner*—Michael Vanchy, Jr.
(74) *Attorney, Agent, or Firm*—Armstrong Teasdale LLP

(57) ABSTRACT

A method for reducing noise in images includes utilizing an original image to generate a segmentation mask and a filtered image, and utilizing the filtered image, the original image, the segmentation mask and separate blending parameters for structural and nonstructural portions of the filtered image to generate a blended image. The method further includes contrast matching the blended image with the original image to produce an output image.

34 Claims, 4 Drawing Sheets

METHODS AND APPARATUS FOR NOISE REDUCTION FILTERING OF IMAGES

BACKGROUND OF THE INVENTION

This invention is generally directed to methods and apparatus for improving images that are particularly useful for filtering noise from high temporal resolution Electron Beam Computed Tomography (EBCT) images, although the methods and apparatus described herein are not limited to EBCT images and can be applied to images obtained from other sources.

Electron beam computed tomography (EBCT) is a non-invasive imaging technique for capturing images of human organs. To capture images by using an EBCT scanner, a focused electron beam is directed onto tungsten targets. The focusing is done with the help of a focusing system. Due to the impinging of the electron beam, X-rays are produced at the tungsten targets. These X-rays are directed at semi-circular detectors. The X-rays pass through the object, which is to be imaged, and are collected by the detectors.

The resolution of an image obtained from an EBCT scanner depends on the width of the detectors, the collimation of the electron beam, and the width of the electron beam focus spot on the targets. Images obtained from EBCT systems have high temporal resolution and therefore higher noise levels than those typically obtained using CT systems of the rotating gantry type.

BRIEF DESCRIPTION OF THE INVENTION

Some aspects of the present invention therefore provide a method for reducing noise in images. The method includes utilizing an original image to generate a segmentation mask and a filtered image, and utilizing the filtered image, the original image, the segmentation mask and separate blending parameters for structural and nonstructural portions of the filtered image to generate a blended image. The method further includes contrast matching the blended image with the original image to produce an output image.

In some aspects, the present invention provides a method for reducing noise in images, wherein the method includes utilizing an original image to generate an image having normalized intensities and utilizing the normalized intensity image to identify structures. The method further includes orientation smoothing and orientation sharpening structural portions of the normalized intensity image and homogenization smoothing non-structural portions of the normalized intensity image to produce a filtered image, renormalizing intensities of the filtered image to produce a renormalized filtered image, utilizing the renormalized filtered image and the original image to produce a blended image, and contrast matching the blended image to produce an output image.

In yet other aspects, the present invention provides an apparatus for reducing noise in images. The apparatus includes a computer configured to utilize an original image to generate a segmentation mask and a filtered image, and utilize the filtered image, the original image, the segmentation mask and separate blending parameters for structural and nonstructural portions of the filtered image to generate a blended image. The computer is further configured to contrast match the blended image with the original image to produce an output image.

In still other aspects, the present invention provides an apparatus for reducing noise in images. The apparatus includes a computer that is configured to utilize an original image to generate an image having normalized intensities and utilize the normalized intensity image to identify structures. The computer is also configured to orientation smooth and orientation sharpen structural portions of the normalized intensity image and homogenization smooth non-structural portions of the normalized intensity image to produce a filtered image, renormalize intensities of the filtered image to produce a renormalized filtered image, utilize the renormalized filtered image and the original image to produce a blended image, and contrast match the blended image to produce an output image.

In yet other aspects, the present invention provides a machine readable medium having recorded thereon instructions that are configured to instruct a computer to utilize an original image to generate a segmentation mask and a filtered image, and utilize the filtered image, the original image, the segmentation mask and separate blending parameters for structural and nonstructural portions of the filtered image to generate a blended image. The instructions are further configured to instruct the computer to contrast match the blended image with the original image to produce an output image.

In still other aspects, the present invention provides a machine readable medium having recorded thereon instructions that are configured to instruct a computer to utilize an original image to generate an image having normalized intensities and utilize the normalized intensity image to identify structures. The instructions are also configured to instruct a computer to orientation smooth and orientation sharpen structural portions of the normalized intensity image and homogenization smooth non-structural portions of the normalized intensity image to produce a filtered image, renormalize intensities of the filtered image to produce a renormalized filtered image, utilize the renormalized filtered image and the original image to produce a blended image, and contrast match the blended image to produce an output image.

Other aspects of the present invention provide an electron beam computed tomographic (EBCT) scanner that includes a vacuum chamber, an electron gun configured to produce an electron beam that passes through the vacuum chamber, an assembly of targets, a focusing and scanning system configured to focus the electron beam so that it impinges upon a target in the assembly of targets and produce an X-ray beam, an assembly of detectors configured to detect the produced X-ray beams that pass through an object and to produce a digitized intensity distribution of detected X-rays representative of an original image of the object, and a data processing system. The data processing system is configured to receive and process the original image of the object, utilize the original image to generate a segmentation mask and a filtered image, and utilize the filtered image, the original image, the segmentation mask and separate blending parameters for structural and nonstructural portions of the filtered image to generate a blended image. The data processing system is further configured to contrast match the blended image with the original image to produce an output image.

In yet other aspects, the present invention provides an electron beam computed tomographic (EBCT) scanner that includes a vacuum chamber, an electron gun configured to produce an electron beam that passes through the vacuum chamber, an assembly of targets, a focusing and scanning system configured to focus the electron beam so that it impinges upon a target in the assembly of targets and produce an X-ray beam, an assembly of detectors configured to detect the produced X-ray beams that pass through an object and to produce a digitized intensity distribution of detected X-rays representative of an original image of the object, and a data processing system. The data processing system is configured to receive and process the original image of the object, utilize an original image to generate an image having normalized intensities, and utilize the normalized intensity image to identify structures. The data processing system is further configured to orientation smooth and orientation sharpen structural portions of the normalized intensity image and homogenization smooth non-structural portions of the normalized intensity image to produce a filtered image, renormalize intensities of the filtered image to produce a renormalized filtered image, utilize the renormalized filtered image and the original image to produce a blended image, and contrast match the blended image to produce an output image.

Methods and apparatus of the present invention are particularly useful for reducing noise in medical images, but many configurations of the present invention can be used for improving images of non-medical objects as well. In addition, many configurations of the present invention can be used with imaging modalities other than scanning electron beam computed tomography to reduce noise in images.

DETAILED DESCRIPTION OF THE INVENTION

Figure 1:
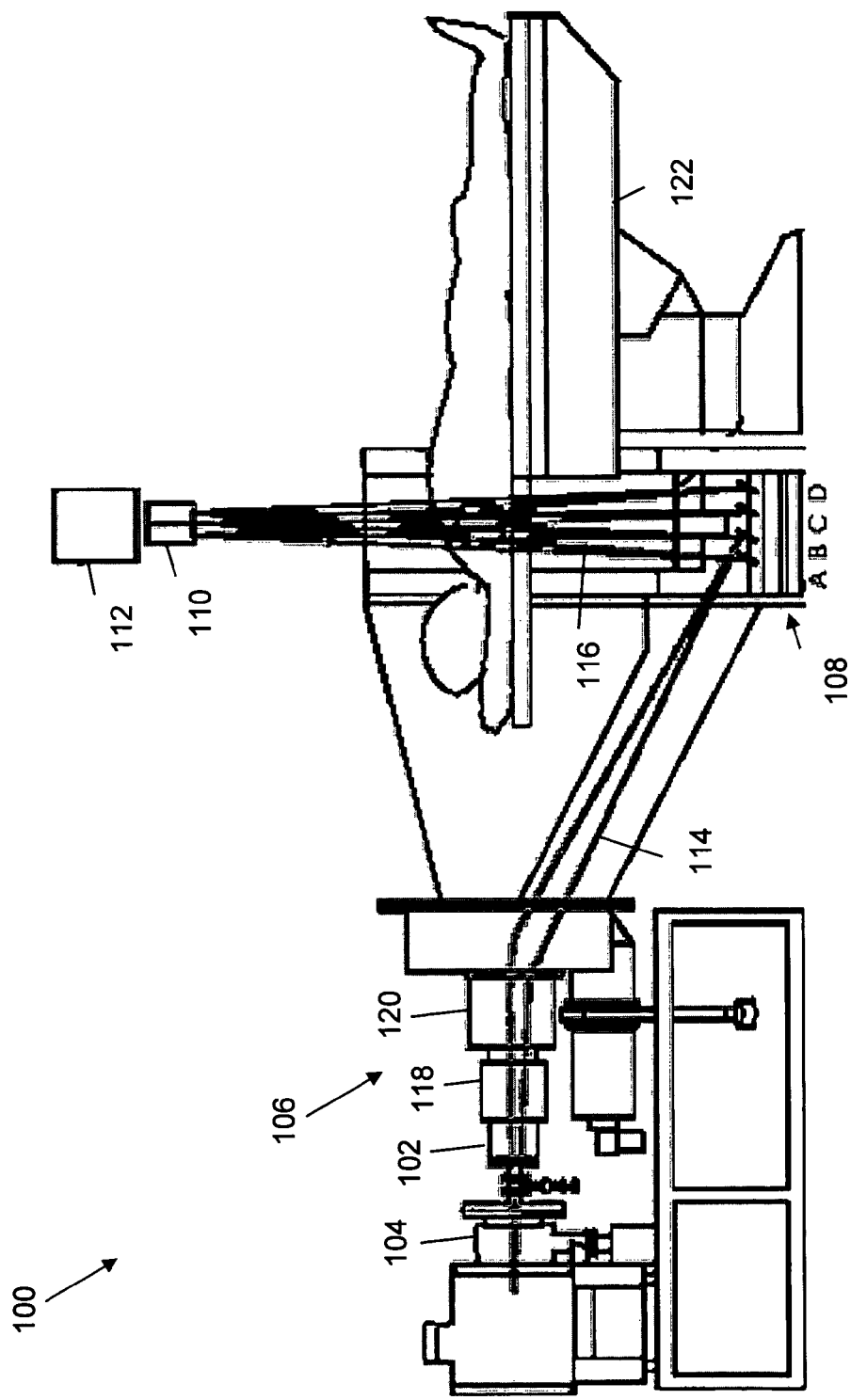
FIG. 1 is a sectional side view of an electron beam computed tomography (EBCT) scanner.

The present invention is directed to filtering of electron beam computed tomography imaging. Technical effects of the present invention include the improvement of images obtained from EBCT scanners. The technique is particularly useful for reducing noise in medical images, but can be used for improving images of non-medical objects as well. It is noted that, while in the present discussion reference is made to discrete pixel images generated by an EBCT system, the systems and methods described herein are not limited to any particular imaging modality. Accordingly, the systems and methods may also be applied to image data acquired by X-ray systems, digital radiography systems, positron emission tomography (PET) systems, and MRI systems, among others.

It should also be noted that in the embodiment described, signal processing circuits, memory circuits, and input and output interface circuits can be included in a programmed digital computer. However, circuitry for carrying out the techniques described herein may be configured as appropriate coding in application-specific microprocessors, analog circuitry, or a combination of digital and analog circuitry. Whether implemented as a programmed digital computer or processor or as alternative electronic components and/or modules configured to perform the techniques described herein, memory can be included for storing and/or retrieving instructions and/or image data. Such memory may include random access memory (RAM), read-only memory (ROM), and/or one or more secondary storage devices such as a floppy disk drive, CD-ROM drive, DVD drive, magnetic optical disk (MOD) device, or any other digital device including a network connecting device such as an Ethernet device for reading instructions and/or data from a machine readable medium, such as a floppy disk, a CD-ROM, a DVD or another digital source such as a network or the Internet, as well as yet to be developed digital means. In some configurations, a computer executes instructions stored in firmware or from a machine readable medium having instructions recorded thereon that instruct the computer to perform certain operations. The term "machine readable medium" as used herein is not limited to a single floppy disk, CD-ROM, DVD, hard drive, or the like, as in some instances, it may be convenient or even necessary to divide the computer instructions onto a plurality of floppy disks, CD-ROMs, DVDs, hard drives, etc., or to put some instructions on a floppy disk and others on a CD-ROM. Therefore, the term "a machine readable medium having recorded thereon instructions configured to instruct a computer" to perform various operations includes within its scope any combination of plural media or media types that, taken together, include the entirety of the recorded instructions that perform the recited operations.

A computer programmed to perform functions described herein, and as used herein, is not limited to just those integrated circuits referred to in the art as computers and microprocessors, but broadly refers to computers, processors, microcontrollers, microcomputers, programmable logic controllers, application specific integrated circuits (ASIC), and other programmable circuits, and these terms are used interchangeably herein. As is known in the art, some memory devices, particularly solid state memory devices such as RAM and ROM, may be included with a central processing unit as part of a computer chip. For example, data processing system 112 in some configurations comprises such a computer chip in addition to one or more secondary storage devices, as well as on- or off-chip RAM and/or ROM storage. The term "computer" as used herein is intended to refer generally to an electronic computing device of any of the types described above, and may include associated memory and/or secondary storage devices of one or more types. It may also include one or more devices, such as a keyboard and/or a mouse, to accept instructions or other input data from a user, and/or one or more display devices, such as a CRT, LCD, or plasma display. Data processing system 112, for example, is included within the scope of the more general term "computer."

Although reference is made to an "image" and to a "mask" herein, it should be understood that these terms can refer to electronic representations of same, such as is stored in a memory of a computer, rather than printed or displayed images or masks. Thus, most operations on an image or mask, such as "shrinking an image," refer to data processing steps. However, "displaying an image" refers to the electronic conversion of data representing an image into a form perceptible by a human eye. As is known in the art, electronic images can be displayed by a computer from such data on devices such as CRT, LCD, or plasma displays.

FIG. 1 is a sectional side view of an EBCT scanner 100, in which the method of the present invention can be practiced. This scanner may be identical to the scanner disclosed in U.S. Pat. No. 4,631,741, titled "Beam spot monitoring arrangement for use in a scanning electron beam computed tomography scanner and method", filed on Apr. 5, 1984, and assigned to Imatron, Inc. However, it will be apparent to those skilled in the art that the current invention can be practiced with any other EBCT scanner or even with other imaging devices, medical or otherwise, in which a reduction of noise in images is sought. It should also be apparent that many configurations of the present invention can be practiced using image data obtained from an imaging device, using computers and/or other processing devices mentioned above that can be separate from and otherwise independent of the imaging device itself. With respect to the description of EBCT scanner 100 used herein as an example, only certain specific features of the scanner described in U.S. Pat. No. 4,631,741 are described herein. In addition to these features, scanner 100 may provide other features and/or include other components that are not part of the present invention but that may be necessary for the operation of scanner 100.

Scanner 100 includes a vacuum chamber 102, an electron gun 104, a focusing and scanning system 106, an assembly of targets 108, an assembly of detectors 110, and a data processing system 112. Scanner 100 may further include a patient table 122, on which an object to be scanned may be placed. Electron gun 104 produces a beam of electrons 114. Electron beam 114 passes through vacuum chamber 102 and is focused by scanning and focusing system 106 so that it impinges on a target in assembly of targets 108. An X-ray 116 is produced due to the impinging of electron beam 114 on assembly of targets 108. The targets in assembly of targets 108 are positioned in such a way that X-ray 116 is directed at assembly of detectors 110. X-ray 116 passes through the object, which has to be imaged, and reaches a detector in assembly of detectors 110. The detector measures the distribution of intensity of X-ray 116. This intensity distribution is digitized and processed by data processing system 112.

Scanning and focusing system 106 further includes a solenoid coil 118 and an assembly of focus coils 120, that are responsible for focusing electron beam 114 and sweeping electron beam 114 across assembly of targets 108. Though the system for scanning and focusing referred to in this disclosure is of the type described above, it will be apparent to those skilled in the art that any other system could be used to affect the scanning and focusing of electron beam 114. For example, an electrical field focusing device could be used to scan and focus electron beam 114.

Figure 2:
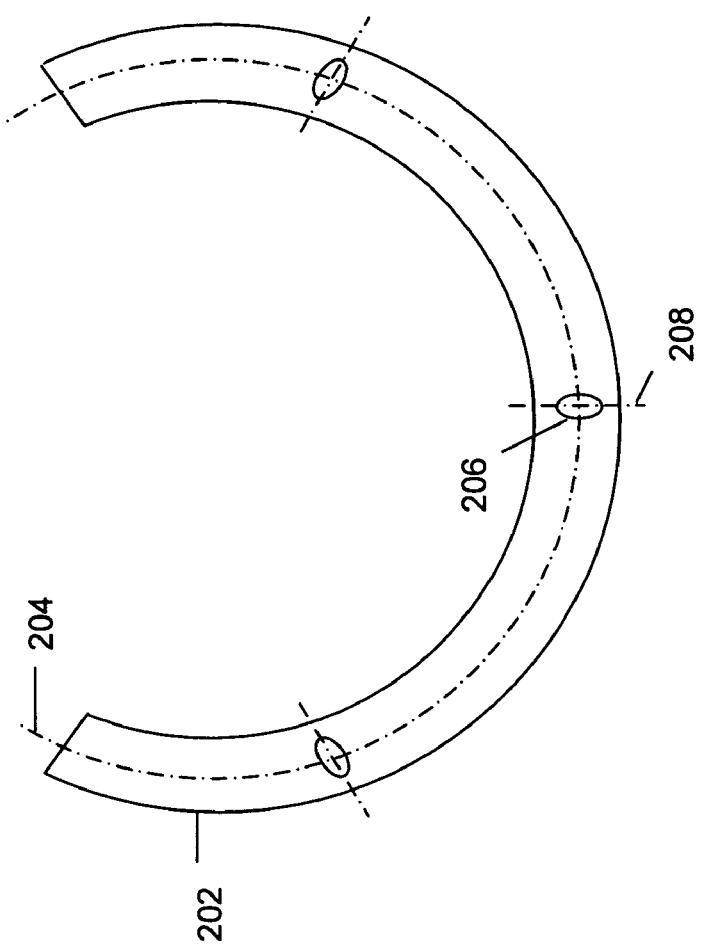
FIG. 2 is a sectional front view of a target of the EBCT scanner of FIG. 1.

FIG. 2 is a front view of a target 202 of assembly of targets 108 (as shown in FIG. 1). Electron beam 114 (as shown in FIG. 1) moves along azimuthal axis 204 of detector 202. A cross-section 206 of electron beam 114, as it moves across target 202, is shown as elliptical. The major axis of the elliptical section is along radial direction 208. The minor axis of the elliptical section is along azimuthal axis 204. Cross section 206 is created by assembly of focus coils 120 (as shown in FIG. 1) that focuses electron beam 114 to a spot on target 202 utilizing differential focal strength optics.

In some configurations of the present invention, an image produced by data processing system 112 from a scan of an object is further processed by data processing system 112. The practice of the invention is not limited to data processing systems that are internal to EBCT scanners 100 or other imaging devices, however. Thus, in some configurations, image data is input to a workstation or any other type of data processing system, computer, ASIC, microcontroller, etc., such as those mentioned above, which are appropriately programmed using firmware and/or software having processor instructions recorded on machine readable media such as CD-ROMs, floppy diskettes, hard drives, optical drives, etc. Likewise, a resulting processed image is not required to be displayed on a display device that is associated with the device that acquired the original image, but rather can be displayed on the display of a workstation or printed out, etc. Without intending any loss of generality, the description herein focuses on a configuration in which data processing system 112 of an EBCT scanner 100 is configured to perform one or more of the methods described herein.

Figure 3:
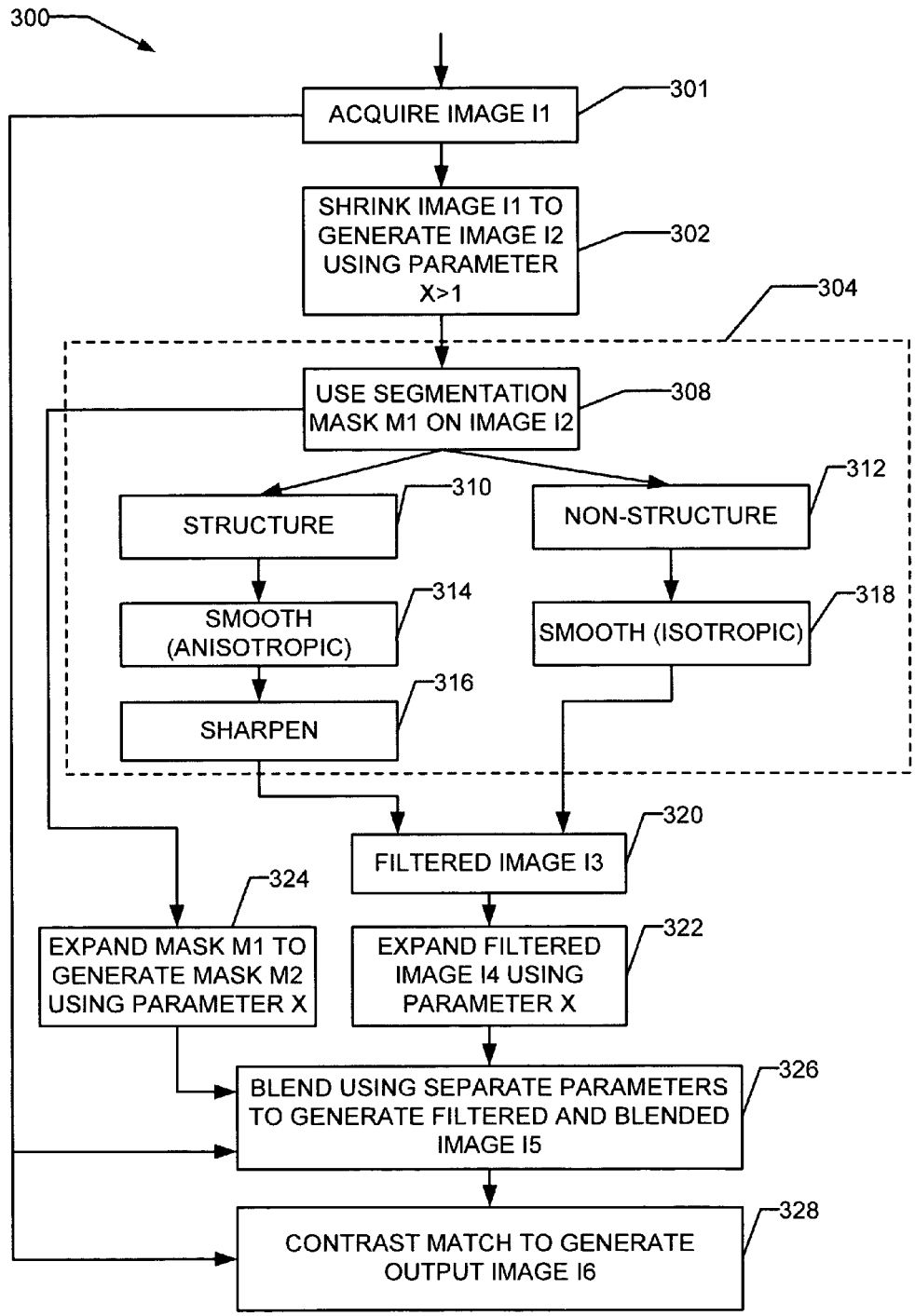
FIG. 3 is a flow chart representative of a noise reduction method used by some configurations of data processing systems in electron beam computed tomography scanners of the present invention, such as is shown in FIGS. 1 and 2.

Referring to flow chart 300 of FIG. 3, a technical effect of the present invention is achieved by first preshrinking a digitized input image (I1) initially acquired at 301 by image processing system 112 and which can have any dimensionality (including 2-D, 3-D, 4-D, etc.). Image I1 is shrunk at 302 by a pre-specified or predetermined factor X (where X greater than 1). (As used herein, the terms "pre-specified" and "predetermined" are to refer to a parameter that is either selected or known prior to the processing of input image I1. For present purposes, the terms "pre-specified" and "predetermined" may be considered as synonymous with one another and meaning that a parameter is supplied prior to performance of the processing steps for image I1.) The shrunken image at 302 thereby becomes intermediate image I2. Intermediate image I2 is then filtered at 304 using a noise reduction filter to form an intermediate filtered image I3.

In some configurations of the present invention, the implementation of noise reduction filter 304 includes masking image I2 using a segmentation mask M1 at 308 to separate image I2 into a structural portion at 310 and a non-structural portion at 312. This mask operation produces a mask image M1 having digital values gmask(x,y). In the mask operation, a digital value of a pixel is set to 1 if the corresponding pixel (x,y) in image I2 is structure and set to 0 if the corresponding pixel (x,y) in image I2 is non-structure. In some configurations, structure is distinguished from non-structure as follows. A normalized image Inorm is formed from intermediate image I2. Intermediate image I2 is normalized by reading digital values ga(x,y) of image I2 and scaling the values over a desired dynamic range. A gradient image Igrad is computed from a blurred or smoothed version of the normalized image Inorm. Suitable smoothing operations include, but are not limited to boxcar smoothing. In boxcar smoothing, a boxcar filter smooths the normalized image Inorm by computing an average over a given neighborhood. The kernel is separable and its length, such as, for example, 3 pixels, is variable. The kernel is moved horizontally and vertically along the normalized image Inorm until each image pixel has been processed. The smoothing operation results in an image I2S having digital values gs(x,y).

Structural image portion 310 is then anisotropically smoothed at 314, after which it is sharpened at 316 to produce a filtered structural image portion. The non-structural image portion at 312 is isotropically smoothed at 318 to produce a filtered non-structural image portion. For example, at every pixel of the image Is, computed are an X gradient component, a Y gradient component, and a resultant gradient as the maximum of the two components. If desired, the direction of the gradient using arctan(Y gradient component/X gradient component) can be computed. While several techniques may be employed for this purpose, in one embodiment, 3×3 Sobel modules or operators are employed. One module is used for identifying the X gradient component, while another module is used for identifying the Y gradient component of each pixel of the image I2S. In this process, the modules are superimposed over an individual pixel of interest in the image I2s, with the pixel of interest situated at the central position of the 3×3 module. The digital values gs(x,y) located at element locations within each module are multiplied by the scalar value contained in the corresponding element, and the resulting values are summed to arrive at the corresponding X and Y gradient components.

With these gradient components thus computed, the gradient magnitude Gmag and gradient direction Gdir are computed. The gradient magnitude Gmag for each pixel is equal to the higher of the absolute values of the X and Y gradient components for the respective pixel. The gradient direction is determined by finding the arctangent of the Y gradient component divided by the X gradient component. For pixels having an X gradient component equal to zero, the gradient direction is assigned a value of π/2. The values of the gradient magnitudes Gmag and gradient directions Gdir for each pixel are saved in a memory circuit.

In some configurations, alternative techniques are employed for identifying the X and Y gradient components and for computing the gradient magnitudes and directions. For example, in place of Sobel gradient modules, other modules such as the Roberts or Prewitt operators are employed. Moreover, the gradient magnitude Gmag can be assigned in other manners, such as a value equal to the sum of the absolute values of the X and Y gradient components or a value equal to a square root of a sum of squares of the X and Y gradient components.

A gradient histogram is created in accordance with the gradient magnitudes Gmag. The gradient histogram is a bar plot (or an electronic equivalent thereof) of specific populations of pixels having specific gradient magnitudes Gmag. These gradient magnitudes Gmag are indicated by positions along a horizontal axis, while counts of the pixel populations for each gradient magnitude Gmag are indicated along a vertical axis, with each count falling at a discrete level. The resulting bar graph forms a step-wise gradient distribution curve. An electronic equivalent of the gradient histogram can be functionally provided by a signal processing circuit operating in cooperation with values stored in memory.

The gradient histogram is used to identify an initial gradient threshold (IGT) for separating structure from non-structure. The IGT is set at a desired gradient magnitude level Gmag. Pixels having gradient magnitudes Gmag at or above the IGT are considered to meet a first criterion for defining structure, while pixels having gradient magnitudes Gmag lower than the IGT are initially considered non-structure. The IGT used to separate structure from non-structure is set by an automatic processing or "autofocus" routine. However, alternatively, IGT is set by operator intervention, via an input interface circuit or a value identified through the automatic process described above may be overridden by the operator.

The process for identification of the IGT is as follows. The IGT is conveniently set to a value corresponding to a percentile of the pixel population, such as 30th percentile. The location of the IGT along the horizontal axis is thus determined by adding pixel population counts from the left-hand edge of the gradient histogram, adjacent to the vertical axis and moving toward the right. Once a desired percentile value is reached, the corresponding gradient magnitude Gmag is the value assigned to the IGT. It is noted that in an alternative embodiment, the smoothing and the normalization operations that are described above are not performed.

The mask image Imask is isotropically smoothed in the non-structure region of the image at 318 and anisotropically smoothed in the structure region of the image at 314. The smoothed anisotropically filtered structure region is sharpened at 316. Boxcar smoothing, which is an example of isotropic smoothing, is described above. In anisotropic smoothing, the structure region is filtered to extract domain orientation information. Anisotropic smoothing involves iteratively filtering the structure by a smoothing kernel, such as a 3×1 smoothing kernel, along a dominant direction in a given neighborhood of the image Imask, which would be the direction of majority of the local minimum variances in that neighborhood. The iterations are performed a set number of times, such as, for instance, 3 times.

Each iteration is accomplished using the following steps. The structure region is scanned and a local orientation map is obtained by assigning one of four orientation numbers, for instance, assigning 1 for 45 degrees, 2 for 135 degrees, 3 for 90 degrees, and 4 for 0 degrees. The structure region is scanned again and the dominant orientation at any point is determined by counting the number of different orientations in a neighborhood of the image Imask. An orientation getting the maximum counts is the dominant orientation.

As a further refinement, both the dominant orientation and its orthogonal orientation are used to make a consistency decision. The consistency decision is made if one of the following conditions is met: (1) An orientation getting maximum counts is greater than a pre-specified percentage, for instance, 0.67 percent, of the total counts in a neighborhood of the image Imask and its orthogonal orientation gets the minimum counts, (2) An orientation getting maximum counts is greater than a smaller percentage, for example, 0.44 percent, of the total counts in a neighborhood of the image Imask, its orthogonal orientation gets the minimum count, and the ratio of the dominant count and its orthogonal count is greater than a pre-specified number, for example, 5, and (3) The ratio of a dominant count to its orthogonal count is greater than 10. Smoothing is performed along a dominant orientation.

The smoothed and then sharpened non-structural image portion is then combined with the filtered structural image portion at 320 to produce a filtered image I3, which is then expanded by the factor X referred to above to produce another image I4 at 322 using a suitable interpolation function (e.g., a cubic interpolation). Additionally, the segmentation mask at 308 is also expanded using a suitable interpolation function by the same factor X at 324 to form an interpolated mask M2. Image I4 is then blended with I1 at 326 using separate blending parameters for structure and non-structure to form an intermediate filtered output I5 in accordance with M2 so that different blending parameters (e.g., $0<\alpha_{\Sigma T}<1$ and $0<\alpha_{N\Sigma T}<1$) can be used for structure and non-structure regions. This image I5 is contrast matched with input image I1 at 328 using a suitable contrast-matching procedure to yield a final contrast matched, filtered image I6. Image I6 is a noise-reduced version of original input image I1.

Figure 4:
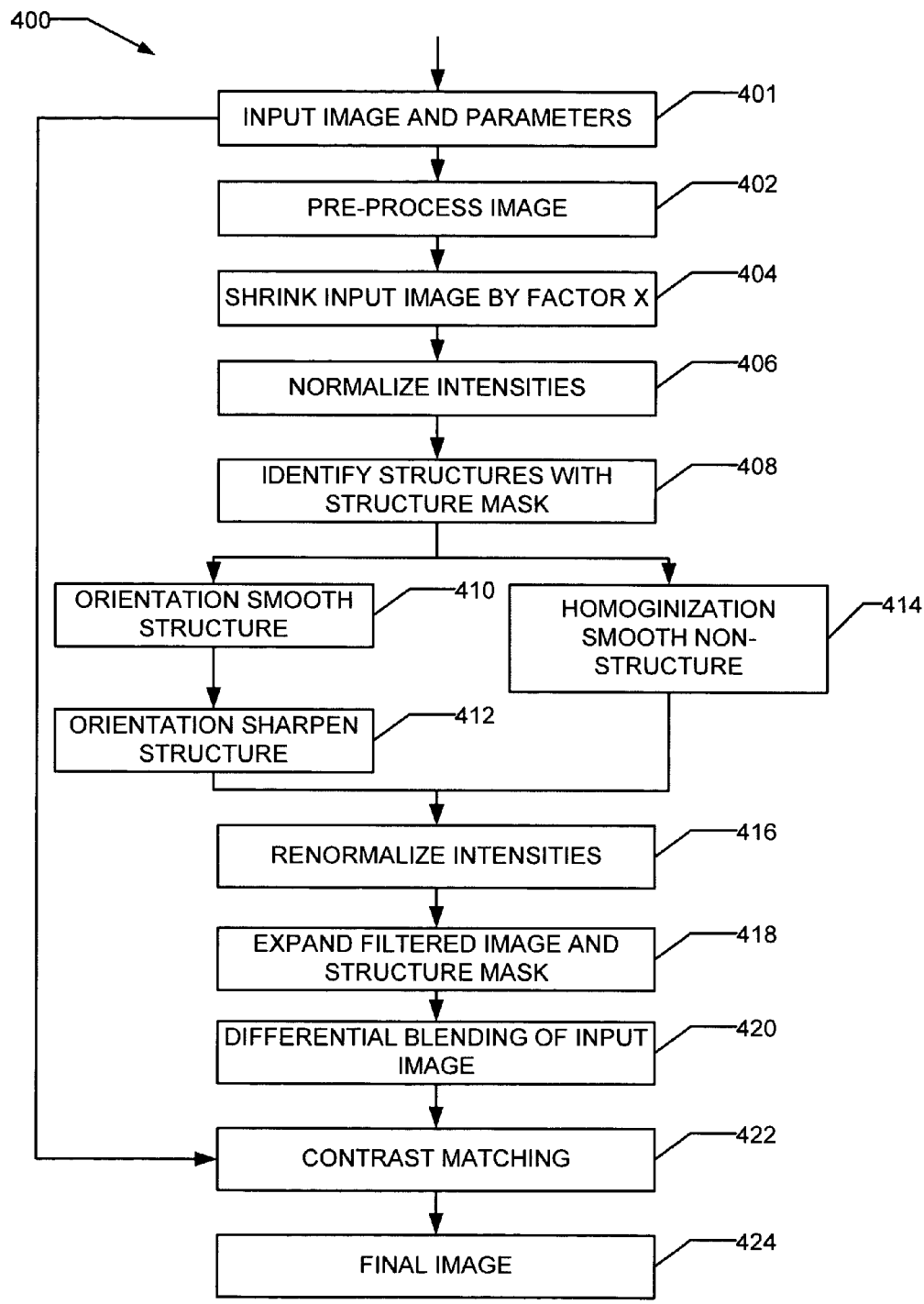
FIG. 4 is a flow chart representative of a noise reduction method performed in another configuration of data processing system.

In some other configurations and referring to flow chart 400 of FIG. 4, at 401, input data and parameters that control filtering are read. These parameters including the amount of shrinking (denoted herein by "interp"), interpolation type ("interpMode"), and parameters specific to noise reduction ("Focus", "Edge", "EdgeThreshold", "Blend", and "edge-Blend"). In some configurations, for EBCT images, interp is set to 2. The domain knowledge of a radiologist/radiological technician operating the instrumentation can be utilized to tune the other parameters. By this selection of shrinking parameter in some configurations of the present invention, specialized tuning for larger matrix images is not required.

At 402, the input image is preprocessed. This preprocessing comprises augmenting the size of the input image to avoid loss of data while images are shrunk. In some configurations of the present invention, a shrink(.) function is used that requires integer values for performing data reduction. In these configurations, the image data is mirrored to provide appropriate padding of image boundaries.

At 404, the preprocessed input images are shrunk in accordance with the parameter interp (e.g., a factor X). The shrink (.) function uses average intensity values in non-overlapping integer neighborhoods of size interp×interp and creates a new shrunken image.

At 406, a number of pre-segmentation operations are performed and intensities are normalized. In some configurations, a scaling is used to make the filtering effect independent of the dynamic range and the DC offset of the data. These operations performed at 406 in some configurations include: initializing internal parameters. The internal parameters and their initializations some configurations are as follows: iter_ number2=10, length=3, areaPercent=0.95, follower_ratio=0.5, gradAngle=0.35, count_threshold1=2, count_threshold2=2. Also at 106, maximum (MAX_ORIGINAL) and minimum (MIN_ORIGINAL) intensity values are determined, and a scale value is set. In some configurations, scale=4095.0/MAX_ORIGINAL. The scaled image I is obtained using a relationship written I=(I−MIN_ORIGINAL)*scale. The pre-filtration image is then saved as I1=I, and an average intensity value MEAN_BEFORE of is determined.

Structure and non-structure masks are determined at 408. This step allows structures and non-structures to be extracted from a given image. In some configurations, the determination of the masks includes computing a gradient image from a smoothed version of the normalized original image generated at 406. A boxcar smoothing function is used in some configurations to smooth an image by an average of a given neighborhood. The boxcar smoothing function is separable, and efficient methods exist for its computation. The length of the separable kernel is variable (parameter length) but is set equal to 3 in some configurations. Also, an edge strength threshold is computed automatically from the image. In some configurations, the following steps are used to determine the edge strength threshold:

1. At every pixel, a componentX and a componentY are determined, and a resultant gradient is determined as the maximum of componentX and componentY. The direction of the gradient is determined using the function arctan(componentY/componentX).
2. A gradient histogram is created and a percentile value (for example, the 30th percentile) is used as an initial gradient threshold (IGT).
3. In a neighborhood of a pixel having a gradient greater than the IGT, the number of pixels that have gradient magnitudes above IGT and having gradient directions that do not differ from the center pixel more than a predetermined angle (parameter gradAngle) are counted. If the count is greater than a predetermined threshold, the current pixel is included as a relevant edge.
4. Isolated small segments less than a predetermined count are eliminated using (for example) an eight-connected connectivity method.
5. The number of edge pixels obtained as a result are counted, and a fuzzy constant added to this number to get a final number N.
6. From the gradient histogram, the final gradient threshold (FGT) is determined. The FGT corresponds to the gradient above which there are N gradient counts.

A connectivity method used in some configurations of the present invention to efficiently remove small islands of high gradient segments includes the following steps:
thresholding the image based on a gradient value to generate a binary image;
labeling the binary image on a line-by-line basis while incrementing a label index;
merging connected labels using a four-connected or eight-connected rule by replacing a current label with a lowest index in a neighborhood (this step is iterated by scanning the binary image from top to bottom and bottom to top until there are no more regions to be merged or a predetermined number of iterations are exceeded);
obtaining a histogram of indices; and
finding index bins of the histogram that are lower than a predetermined number and setting a corresponding pixel in the binary image equal to zero.

The resultant binary image is a mask that does not include small segments of high gradient regions.

The FGT thus obtained is scaled by multiplying with a user-selected parameter, Focus (e.g., 2.0). Next, a binary mask image is created in which pixels are set to 1 for corresponding pixels in the gradient image that are higher than the FGT and set to 0 otherwise.

Isolated small segments in the binary image less than a predetermined count are eliminated using a four-connected connectivity method. The resultant binary image is a mask that includes significant high gradient regions but that is devoid of small islands of high gradient regions.

Next, if a pixel in the gradient image is above a threshold (GFT) that is a predetermined percentage (parameter follower_ratio) of FGT and is connected to a pixel that is above FGT, then a corresponding pixel in the binary image from the previous operation is changed from 0 to 1. This gradient following step is carried out recursively in some configurations. At the end of this process, an initial classification of pixels is obtained.

An intermediate mask and a final mask M that describes the structure and non-structure are obtained. If a current mask pixel is 1, the neighborhood (e.g., 3×3) pixel count is determined. If the determined pixel count is below the value of a parameter countThreshold1 (e.g., 2), then the current mask pixel is set to 0. Also, if the current mask pixel is 0, then the neighborhood (e.g., 3×3) pixel count is determined. If the pixel count is above a parameter countThreshold2 (e.g., 2), then the current mask pixel is set to 1.

Orientation smoothing is performed on structural regions at 410. More specifically, a region with structures is filtered to extract a dominant orientation. In some configurations, this step is accomplished by iteratively filtering structures using a 3×1-smoothing kernel along the dominant direction in a given neighborhood. The "dominant direction in a given neighborhood" is the direction of a majority of local minimum variances in that neighborhood. This iterative filtering process has a tendency to bridge gaps by an amount controlled by a parameter. The iterations are done for a set number of times (e.g., 3). Each iteration is accomplished using the following steps:

First, the structure region is scanned and a local orientation map is created by assigning one of (for example) four orientation numbers, i.e., 1 for 45 degrees, 2 for 135 degrees, 3 for 90 degrees and 4 for 0 degrees. The structure region is scanned again and the dominant orientation at any point is determined by counting the number of different orientations in a neighborhood. The orientation receiving the maximum number of counts is the dominant orientation. In some configurations, both the dominant direction and its orthogonal direction are used to make a consistency decision, which tends to improve the consistency of the dominant orientation as compared to human visual determination. The consistency decision is made in some configurations if one of three conditions is met. (1) The orientation getting the maximum count is greater than a predetermined percentage (e.g., 0.67) of the total neighborhood counts, and an orthogonal orientation gets the minimum counts; or (2) the orientation getting maximum counts is greater than a smaller percentage than the predetermined percentage in the previous case of the total neighborhood counts (e.g., 0.44 instead of 0.67), the orthogonal orientation gets the minimum count, and ratio of dominant and its orthogonal counts is greater than a predetermined number (e.g., 5); or (3) the ratio of the dominant orientation count to its orthogonal orientation count is greater than a predetermined number (e.g., 10). Smoothing (e.g., 3×1) is performed along the direction that receives the most number of counts in that neighborhood. Using a provided relaxation parameter, the dominant orientation smoothing can be reduced or minimized while small high frequency structures are preserved.

Orientation sharpening is performed at 412 on orientation filtered structure pixels that have gradients that are above a predetermined limit (e.g., 2×FGT). This sharpening is performed by first producing a maximum directional edge strength image. To produce this maximum directional edge strength image, a 1-D Laplacian of the image at every pixel in each of the 4 directions mentioned above is obtained using a relationship written as $E(k)=2.0*I(k)-I-(k-1)-I(k+1)$, where index "k" refers to the current location along a given direction, $E(k)$ is edge strength at k, and $I(k)$ is an intensity value at the pixel corresponding to k. After determining all four edge-strengths at a given pixel, the maximum directional edge strength is determined and used for subsequent steps as the edge strength $E(x,y)$ at that location. This process is iterated for all the pixels in the image, except that border pixels in an image are treated differently. For example, in some configurations, border pixels are set to zero for the subsequent steps.

Next, smoothing is performed along the edges of $E(x,y)$ using a process similar to that described above. The smoothed edge strength image is called $ES(x,y)$ for the subsequent discussion. If $ES(x,y)*Edge>EdgeThreshold$, then $ES(x,y)$ is set to EdgeThreshold; or if $ES(x,y)*Edge<-EdgeThreshold$, then $ES(x,y)$ is set to $-EdgeThreshold$.

Next, $I(x,y)$ is set to $I(x,y)+ES(x,y)$, (e.g., Edge=0.1; EdgeThreshold=50), following which $I(x,y)$ is set to 0.0 if it is negative and set equal to a large predetermined value, e.g., 4095.0 if it is greater than that value.

Isotropic or homogenization smoothing is performed at 414 using a homogenizing smoothing step. This step comprises iteratively low-pass filtering the non-structure region with a kernel, for example, a 3×3 kernel. The iterations are performed a predetermined number of times (e.g., iter_number2=10). In some configurations, this predetermined number of iterations assures that no structural information is left and only gradual intensity variations remain.

At block 416, intensities are renormalized. In some configurations of the present invention, the renormalization of intensities includes determining an average pixel intensity (MEAN_AFTER) in the filtered image $I3(x,y)$, determining a normalization factor NORM_FACTOR=MEAN_BEFORE/MEAN_AFTER, and determining a normalized image using a relationship written:

$I3(x,y)=(I3(x,y)*NORM\_FACTOR)+MIN\_ORIGINAL$,
where MIN_ORIGINAL is the minimum intensity of the original image input to block 112.

At block 418, the image $I4(x,y)$ that is output by block 416 is interpolated to expand image $I4(x,y)$ to the original size of the image input to block 112 and expands binary mask M to the same size to obtain an expanded mask M2. In some configurations, bicubic interpolation is used to provide a favorable compromise between computational efficiency and interpolated image quality.

At block 420, the interpolated and filtered version of image $I4(x,y)$, as output by block 318, and pre-filtration image $I1(x,y)$ are blended to produce an image $I5(x,y)$ using a relationship written as:

$I5(x,y)=\alpha*(I4(x,y)-I1(x,y))+I1(x,y)$, if $ME(x,y)=0$, where $\alpha$ is a user selected parameter "Blend" such that $0<\alpha<1$.

Otherwise, $I5(x,y)=\beta*(I4(x,y)-I1(x,y))+I1(x,y)$, if $ME(x,y)=1$, where $\beta$ is a user selected parameter "edgeBlend" such that $0<\beta<1$,
where $ME(x,y)=0$ if a pixel at $(x,y)$ is not on an edge, and $ME(x,y)=1$ if a pixel at $(x,y)$ is on an edge.

At block 422, a contrast matched image $I6(x,y)$ is formed from image I5 using a relationship written:

$I6=I5*LPF(I1)/(LPF(I5)+0.1)$, where LPF(.) is a lowpass filter function. For example, in some configurations of the present invention, a suitable realization of LPF(.) is a box-car filter with 31×31 dimensions.

At block 424, a final result 16 is a noise-reduced image that can be saved for display or any other intended use. Image I6 is a noise-reduced version of original image I1.

Although methods and apparatus described herein are particularly useful for reducing noise in medical images, they can be used for improving images of non-medical objects as well. Moreover, although in the present discussion reference is made to discrete pixel images generated by an EBCT system, the systems and methods described herein are not limited to any particular imaging modality. Accordingly, the systems and methods may also be applied to image data acquired by X-ray systems, digital radiography systems, positron emission tomography (PET) systems, and MRI systems, among others.

While the invention has been described in terms of various specific embodiments, those skilled in the art will recognize that the invention can be practiced with modification within the spirit and scope of the claims.

What is claimed is:

1. A method for reducing noise in images, said method comprising:
   acquiring a single original image using an electron beam computed tomographic scanner;
   generating original image data associated with an input of the single original image;
   generating segmentation mask data from the single original image and a single threshold, the segmentation mask data representing a segmentation mask of structural portions and non-structural portions in the single original image;
   generating filtered image data from the segmentation mask data by scaling intensity values and using a connectivity approach, the filtered image data representing a filtered image;
   defining a first blending parameter for the structural portions in the filtered image and a second blending parameter for the non-structural portions in the filtered image, the first blending parameter different than the second blending parameter;
   generating blended image data from the filtered image data, the original image data, the segmentation mask data, and the blending parameters for; and
   contrast matching the blended image data with the original image data to produce output image data, the output image data representing a single processed image.

2. A method in accordance with claim 1 further comprising:
   shrinking the single original image in accordance with a parameter and X to produce shrunken image data; and
   expanding the segmentation mask and the filtered image in accordance with the parameter X to produce expanded segmentation mask data and expanded filtered image data,
   wherein said generating segmentation mask data and said generating filtered image data comprises filtering the shrunken image data to generate the segmentation mask data and the filtered image data, and said generating blended image data comprises blending the expanded filtered image data with the original image data utilizing the expanded segmentation mask data and the blending parameters to generate the blended image data.

3. A method in accordance with claim 2 wherein generating filtered image data further comprises anisotropically filtering the structural portions of the shrunken image data and isotropically filtering the non-structural portions of the shrunken image data.

4. A method in accordance with claim 3 wherein generating segmentation mask image data comprises:
   determining gradient values for pixels of the shrunken image data;
   computing a histogram of gradient magnitudes; and
   separating the structure portions from the non-structure portions using the gradient histogram.

5. A method in accordance with claim 3 wherein said isotropically filtering comprises boxcar smoothing.

6. A method in accordance with claim 3 wherein said anisotropically filtering comprises filtering a structure region to extract domain orientation information and iteratively filtering structures along a dominant direction in a given neighborhood.

7. A method in accordance with claim 1 further comprising setting a gradient threshold as the single threshold and using the gradient threshold to separate the structure portions from the non-structure portions.

8. A method in accordance with claim 7 further comprising utilizing a dominant orientation and an orthogonal orientation to make a consistency decision.

9. A method in accordance with claim 1 wherein the single original image is a scanning electron beam computed tomography image.

10. An apparatus for reducing noise in images, said apparatus comprising a computer configured to:
   acquire a single original image using an electron beam computed tomographic scanner;
   generate original image data associated with an input of the single original image;
   generate segmentation mask data from the single original image and a single threshold, the segmentation mask data representing a segmentation mask of structural portions and non-structural portions of the single original image;
   generating filtered image data from the segmentation mask data by scaling intensity values and using a connectivity approach, the filtered image data representing a filtered image;
   define a first blending parameter for the structural portions in the filtered image and a second blending parameter for the non-structural portions in the filtered image, the first blending parameter different than the second blending parameter:,
   generate blended image data from the filtered image data, the original image data, the segmentation mask data, and the blending parameters; and
   contrast match the blended image data with the original image data to produce output image data.

11. A computer in accordance with claim 10 further configured to:
   shrink the single original image in accordance with a parameter X to produce shrunken image data; and
   expand the segmentation mask and the filtered image in accordance with the parameter X to produce expanded segmentation mask data and expanded filtered image data,
   wherein, to generate the segmentation mask data and the filtered image data, said computer is configured to filter the shrunken image data to generate the segmentation mask data and the filtered image data, and to blend the expanded filtered image data with the original image data utilizing the expanded segmentation mask data and the separate blending parameters to generate the blended image data.

12. A computer in accordance with claim 11 wherein said computer is further configured to anisotropically filter the structural portions of the shrunken image data and isotropically filter the non-structural portions of the shrunken image data.

13. A computer in accordance with claim 12 wherein said computer is configured to:
   determine gradient values for pixels of the shrunken image data;
   compute a histogram of gradient magnitudes; and
   separate the structure portions from the non-structure portions using the gradient histogram.

14. A computer in accordance with claim 13 further configured to set a gradient threshold as the single threshold and use the gradient threshold to separate the structure portions from the non-structure portions.

15. A computer in accordance with claim 14 further configured to utilize a dominant orientation and an orthogonal orientation to make a consistency decision.

16. A computer in accordance with claim 12 wherein, to isotropically filter, said computer is configured to utilize boxcar filtering.

17. A computer in accordance with claim 12 wherein, to anisotropically filter, said computer is configured to filter the structural portions to extract domain orientation information and iteratively filter the structural portions along a dominant direction in a given neighborhood.

18. A computer in accordance with claim 10 wherein said computer is configured as a data processing system in the electron beam computed tomography scanner.

19. A non-transitory machine readable medium comprising instructions recorded thereon, said instructions configured to instruct a computer to: generate original image data associated with an input of a single original image; generate segmentation mask from the single original image and a single threshold, the segmentation mask data representing a segmentation mask of structural portions and non-structural portions of the single original image; generate filtered image data from the segmentation mask data by scaling intensity values and using a connectivity approach, the filtered image data representing a filtered image; define a first blending parameter for the structural portions in the filtered image and a second blending parameter for the non-structural portions in the filtered image, the first blending parameter different than the second blending parameter; generate blended image data from the filtered image data, the original image data, the segmentation mask data, and blending parameters; and contrast match the blended image data with the original image data to produce output image data.

20. A machine readable medium in accordance with claim 19 further comprising thereon instructions configured to instruct the computer to:
   shrink the single original image in accordance with a parameter X; and
   expand the segmentation mask data and the filtered image data in accordance with the parameter X to produce expanded segmentation mask data and expanded filtered image data,
   wherein, to generate the segmentation mask data and the filtered image data, said instructions are further configured to instruct the computer to filter the shrunken image data to generate the segmentation mask data and the filtered image data, and to blend the expanded filtered image data with the original image data utilizing the expanded segmentation mask data and the blending parameters to generate the blended image data.

21. A machine readable medium in accordance with claim 20 further comprising thereon instructions configured to instruct the computer to anisotropically filter the structural portions of the shrunken image data and isotropically filter the non-structural portions of the shrunken image data.

22. A machine readable medium in accordance with claim 21 further comprising thereon instructions configured to instruct the computer to:
  determine gradient values for pixels of the shrunken image data;
  compute a histogram of gradient magnitudes; and
  separate the structure portions from the non-structure portions using the gradient histogram.

23. A machine readable medium in accordance with claim 22 further comprising thereon instructions configured to instruct the computer to set a gradient threshold as the single threshold and use the initial gradient threshold to the separate structure portions from the non-structure portions.

24. A machine readable medium in accordance with claim 23 further comprising thereon instructions configured to instruct the computer to utilize a dominant orientation and an orthogonal orientation to make a consistency decision.

25. A machine readable medium in accordance with claim 21 further comprising thereon instructions configured to instruct the computer to isotropically filter via boxcar filtering.

26. A machine readable medium in accordance with claim 21 further comprising thereon instructions configured to instruct the computer to filter the structural portions to extract domain orientation information and iteratively filter the structural portions along a dominant direction in a given neighborhood.

27. An electron beam computed tomographic (EBCT) scanner comprising:
  a vacuum chamber;
  an electron gun configured to produce an electron beam that passes through said vacuum chamber;
  an assembly of targets;
  a focusing and scanning system configured to focus the electron beam so that it impinges upon at least one target in said assembly of targets and to produce an X-ray beam;
  an assembly of detectors configured to detect the produced X-ray beam that pass through an object and to produce a digitized intensity distribution of the detected X-ray beam that is representative of a single original image of the object; and
  a data processing system configured to receive and process the single original image of the object, said data processing system further configured to:
    generate original image data associated with the single original image produced using said EBCT scanner;
    generate segmentation mask data from the single original image and a single threshold, the segmentation mask data representing a segmentation mask of structural portions and non-structural portions of the single original image;
    generate filtered image data from the segmentation mask data by scaling intensity values and using a connectivity approach, the filtered image data representing a filtered image;
    define a first blending parameter for the structural portions in the filtered image and a second blending parameter for the non-structural portions in the filtered image, the first blending parameter different than the second blending parameter;
    generate blended image data from the filtered image data, the original image data, the segmentation mask data, and blending parameters; and
    contrast match the blended image data with the original image data to produce output image data.

28. A scanner in accordance with claim 27 wherein said data processing system is further configured to:
  shrink the single original image in accordance with a parameter X to produce shrunken image data; and
  expand the segmentation mask data and the filtered image data in accordance with the parameter X to produce expanded segmentation mask data and expanded filtered image data,
  wherein, to generate the segmentation mask data and the filtered image data, said data processing system is configured to filter the shrunken image data to generate the segmentation mask data and the filtered image data, and to blend the expanded filtered image data with the original image data utilizing the expanded segmentation mask data and the blending parameters to generate the blended image data.

29. A scanner in accordance with claim 28 wherein said data processing system is further configured to anisotropically filter the structural portions of the shrunken image data and isotropically filter the non-structural portions of the shrunken image data.

30. A scanner in accordance with claim 29 wherein said data processing system is configured to determine gradient values for pixels of the shrunken image data, compute a histogram of gradient magnitudes, and separate the structure portions from the non-structure portions using the gradient histogram.

31. A scanner in accordance with claim 30 wherein said data processing system is further configured to set a gradient threshold as the single threshold and use the gradient threshold to separate the structure portions from the non-structure portions.

32. A scanner in accordance with claim 31 wherein said data processing system is further configured to utilize a dominant orientation and an orthogonal orientation to make a consistency decision.

33. A scanner in accordance with claim 29 wherein said data processing system is further configured to isotropically filter via boxcar filtering.

34. A scanner in accordance with claim 29 wherein said data processing system is further configured to filter the structural portions to extract domain orientation information and to iteratively filter the structural portions along a dominant direction in a given neighborhood.

* * * * *